United States Patent [19]

Raymond

[11] Patent Number: 4,831,680

[45] Date of Patent: May 23, 1989

[54] WINDSHIELD WIPER HAVING AN AUXILIARY LEVER ARM

[75] Inventor: Bernard Raymond, Paris, France

[73] Assignee: Valeo Systemes D'Essuyage, Issy-les-Moulineaux, France

[21] Appl. No.: 149,167

[22] Filed: Jan. 27, 1988

[30] Foreign Application Priority Data

Jan. 27, 1987 [FR] France .................. 87 00909

[51] Int. Cl.⁴ .............................................. B60S 1/04
[52] U.S. Cl. .................................................. 15/250.42
[58] Field of Search .................... 15/250.32–250.42

[56] References Cited

U.S. PATENT DOCUMENTS 3,158,890 12/1964 Anderson .................. 15/250.42
3,263,262 8/1966 Wise ........................... 15/250.42
4,438,543 3/1984 Noguchi et al. .

FOREIGN PATENT DOCUMENTS 2638010 3/1978 Fed. Rep. of Germany .
1406560 6/1965 France ........................ 15/250.42
2321409 3/1977 France .
887630 1/1962 United Kingdom .

*Primary Examiner*—Peter Feldman
*Attorney, Agent, or Firm*—Wenderoth, Lind & Ponack

[57] ABSTRACT

A windshield wiper blade holder has an auxiliary lever arm having first and second free ends. Each one of the free ends presses against the back of a windshield wiper blade for increasing the force applied to the windshield wiper blade when the curvature of a curved windshield increases. The auxiliary lever arm is preferably hinged to the armature at a point between the hinging of the armature to a driving arm of a vehicle and an end of the armature to which a compensator is pivotably attached. Various compensators and secondary compensators can be pivotably attached to the armature for holding a wiper blade and for cooperating with the auxiliary arm for enhancing the force pressing the wiper blade against the convex windshield.

10 Claims, 2 Drawing Sheets

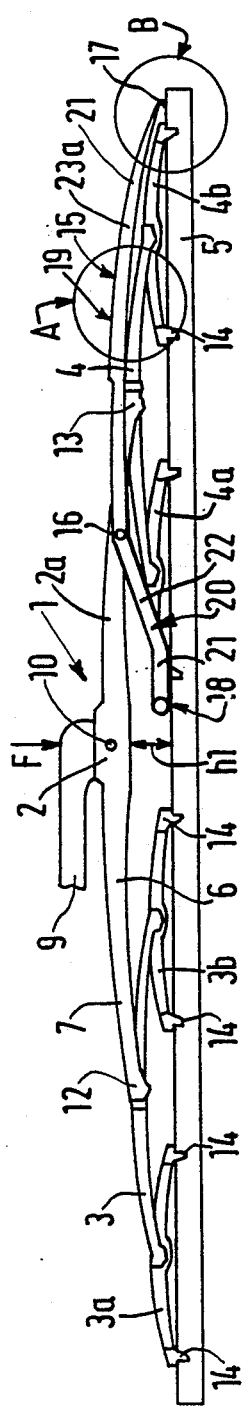
FIG.1
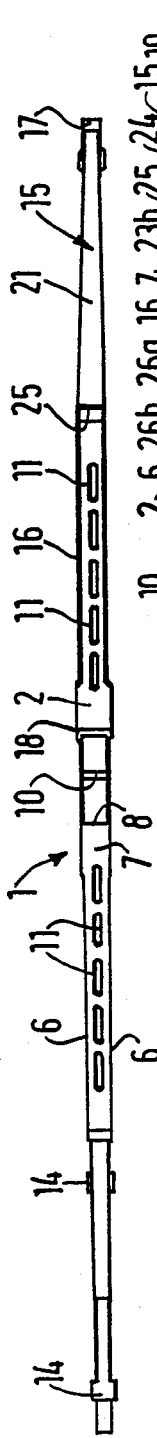
FIG.2
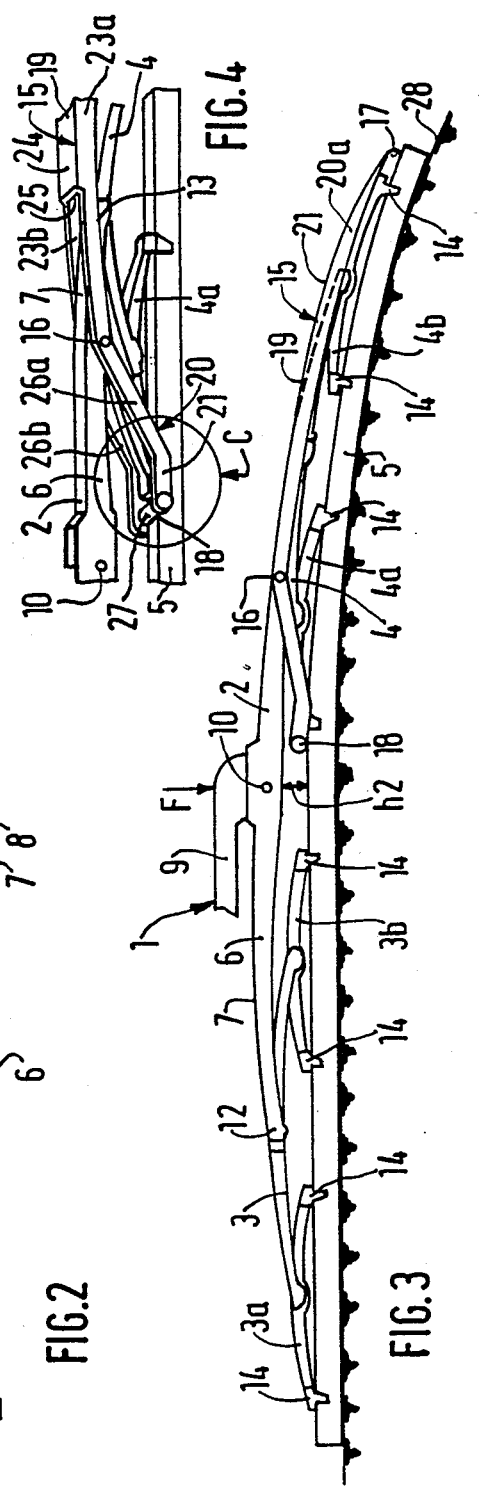
FIG.3
FIG.4

WINDSHIELD WIPER HAVING AN AUXILIARY LEVER ARM

BACKGROUND OF THE INVENTION

This invention pertains to a windshield wiper blade holder intended to equip an automobile, with said blade holder being especially adapted to wipe a convex surface.

Windshields are widened to the greatest possible extent so that automobile drivers can benefit from a very wide forward field of vision. Such widening is achieved by moving the lateral stiles of the windshield back so that the latter is greatly curved on the sides of the vehicle.

The curvature radius of these "panoramic" windshields thus varies a gre at deal, depending if the center of the windshield or its lateral end is considered. As a result of this, windshield wipers wiping a panoramic windshield generally cannot conform to the highly variable curvature of the windshield on a constant basis: if the wiping action is correct in the center of the windshield, it is practically nonexistent on the sides; in rainy weather, this eliminates any increase in visibility expected from the panoramic shape of the windshield.

DESCRIPTION OF THE PRIOR ART

Many devices have been proposed to solve this problem.

Among others, one can mention the device according to French Pat. No. 1,406,560, according to which the windshield wiper contact comprises on, at least one of its ends, a component formed of two swinging arms hinged on the same shaft, substantially mutually symmetrical with respect to said shaft and pulled towards each other by a spring, with said shaft also holding a conventional unitary compensator placed between the two arms. The latter move apart or together due to the action of the spring, depending on if the windshield wiper is pressing on a part of the windshield that respectively has a small or large curvature, with the wiper blade in the first case assuming a substantially rectilinear position, and, in the second case, assuming a greatly curved shape on the side of the end equipped with the aforementioned shaft.

This solution merely follows the curvature of the windshield with the application of less force for the highly curved part.

SUMMARY OF THE INVENTION

The object of this invention is to propose a new solution to make the blade of a windshield wiper follow the surface to be wiped when said surface becomes convex, which is especially the case in wiping the side parts of a windshield, with this solution offering the additional advantage compared to those proposed up to now of ensuring a wiping action which becomes stronger as the surface becomes more convex.

Thus, the object of this invention is a windshield wiper contact comprising an armature intended to be hinged on the end of a windshield wiper arm and comprising at each end at least one hinged compensator, with said compensators making it possible to support a wiper blade suitable to rub against a surface to be wiped, wherein it comprises an auxiliary lever hinged on the part of the armature that extends the arm and whose ends press against the back of the wiper blade, respectively on its median and end areas.

For a clearer understanding of this invention, an embodiment shown in the attached drawing will be described, on a purely illustrative and nonrestrictive basis.

BRIEF DESCRIPTION OF THE DRAWINGS

FIG. 1 is a front view of a windshield wiper contact endowed with its control arm, in resting position.

FIG. 2 is a top view of the windshield wiper contact in FIG. 1, with the control arm removed in order to simplify the drawing.

FIG. 3 is a front view of the windshield wiper contact in FIG. 1, in operating position on the surface of a windshield.

FIG. 4 is a perspective partial cutaway view of the area of the windshield wiper contact where the lever intended to make the wiper blade follow the convex surfaces to be wiped is located.

DESCRIPTION OF THE PREFERRED EMBODIMENT

Figure 5:
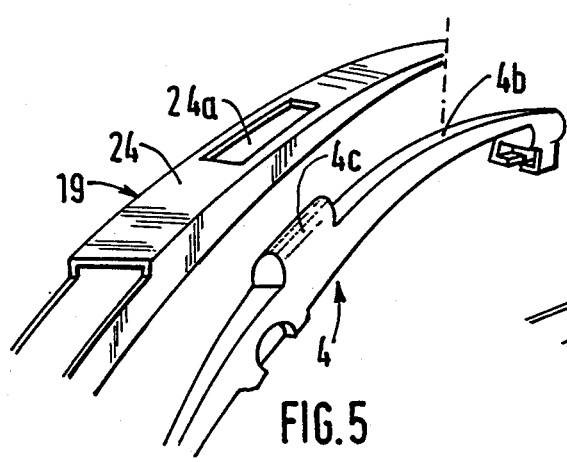
FIG. 5 is a large-scale perspective view of detail A in FIG. 1.

If we refer now to FIG. 1, we see that 1 designates an overall windshield wiper contact comprised of an armature 2 which holds two main compensators 3, 4, each in turn holding two secondary compensators, respectively 3a, 3b, 4a and 4b, whose ends hold a stiffening and support blade (not shown) constituting the back of a wiper blade 5.

Armature 2, having an elongated form, is U-shaped, comprising two legs 6 connected to an end 7. In the median area of armature 2, core 7 expands and, in said expanded part, comprises an opening 8 (FIG. 2), whose width is practically equal to that of said end 7. Legs 6 extend upwards in their part located opposite said opening 8, so as to constitute a coupling block for the control arm 9 of windshield wiper contact 1, in said median area of the armature. For this purpose, legs 6 are connected in the aforementioned area by a shaft 10, perpendicular to them, constituting the hinge shaft for control arm 9.

Each end of armature 2 comprises a hinge shaft, respectively 12 and 13, around which a main compensator, respectively 3 or 4, can swing. Likewise, each end of a main compensator 3 or 4 comprises a hinge shaft around which secondary compensators, respectively 3a, 3b and 4a, 4b, can swing.

The hinge shafts for the aforementioned secondary compensators were not assigned references for purposes of simplifying the drawing, to the extent where such an assembly is totally conventional.

Moreover, the free ends 14 of secondary compensators 3a, 3b and 4a, 4b, are in the form of holding clips for wiper blade 5.

Windshield wiper contact 1 also comprises a lever 15 placed in the area of said contact 1 located opposite the drive shaft (not shown) of control arm 9.

Said lever 15 hinges around a shaft 16 located substantially at the longitudinal midpoint of the part 2a of armature 2 between shafts 10 and 13.

Lever 15 consists of an elongated component, having a general curved shape, with its two free ends pressing on the back of wiper blade 5, on the one hand, in 17, at the end of said wiper blade opposite the drive shaft (not shown) of arm 9, and, on the other hand, in 18, near the area located at right angles with shaft 10, but still in the same half of wiper blade 5.

Lever 15 is composed of two parts having different lengths, namely a part 19 located between hinge shaft 16 and the support point 17 having a general arched shape, with concavity turned towards end 5a of wiper blade 5, and another part 20 located between said shaft 10 and the support point 18 having a general bent shape. Said part 20 comprises a first short branch 21 substantially parallel to the wiper blade 5 and extending from support point 18, and another oblique branch 22 connecting the end of the former to part 19.

Said part 19 of lever 15 extends above the corresponding end of part 2a of armature 2 and the outward-facing branches of main compensator 4 and secondary compensator 4b. It has a U-shaped section, and its legs 23a, 23b, in mounted position, are located on both sides of legs 6 of part 2a of the armature 2, with core 24 being placed above core 7 of armature 2 and the outside branches of compensators 4 and 4b.

In the same part 19, core 19 has an opening 24a located beyond the hinge shaft of the primary compensator 4 towards the end part of contact 5, and said opening 24a cooperates with a dorsal boss 4c of primary compensator 4 and allows lever 15 to be held radially when the latter presses against contact 5, with said contact 5 wiping a highly convex surface, and said primary compensator 4, which is an integral component of part 2a of armature 2 and of secondary compensators 4a and 4b, being radially stiffer than the end of lever 15 (FIG. 5).

The height of legs 23a and 23b tapers down gradually upon approaching the free end of part 19 of lever 15, with said part 19 terminating along a bent-over blade forming support point 17.

Figure 6:
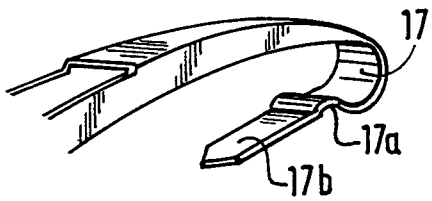
FIGS. 6 and 7 are large-scale perspective views of detail B in FIG. 1.
Figure 7:
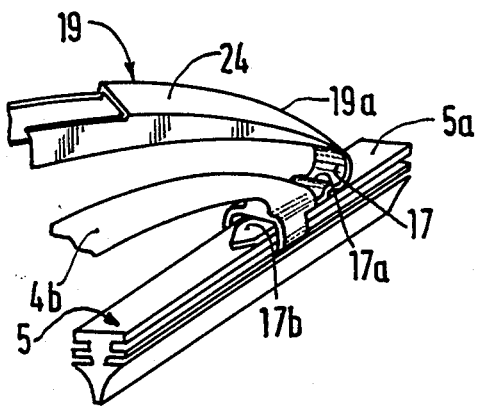

Said bent blade has an extension 17a and 17b consisting of a single piece with lever 15; said extension presses against the back of contact 5 and end 17b slides under the holding clip for secondary compensator 4b, with flange 17b serving to stop end 17b from penetrating under the holding clips; this embodiment prevents the end 21 of lever 15 from escaping laterally from the back of contact 5 (FIG. 6–7) during the wiping action.

Near shaft 16, core 24 comprisers scalloping 25 (FIG. 4), so that in said area, lever 15 is limited to the two regions opposite lateral legs 23a, 23b. These legs extend in 26a, 26b beyond shaft 16, in a manner which is oblique, then substantially parallel to wiper blade 5, to be connected at their free ends by a transverse shaft 18 and a flap 27a forming stop 27 which comes to press against the back of wiper blade 5 when lever 15 is in resting position, with extensions 26a, 26b of the legs and stop 27 forming the aforementioned part 20 of lever 15.

Stop 27 comprises a flap 27a, one end 27b of which is wound around a shaft 18 pivoting on said shaft 18, and the other end 27c of flap 27a slides under the holding clips of the secondary compensator 4a.

Figure 8:
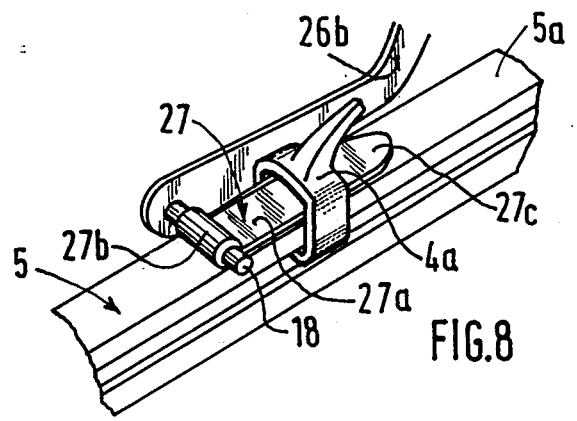
FIG. 8 is a large-scale perspective view of detail C in FIG. 4.

This embodiment prevents stop 27 from escaping laterally from the back of wiper blade 5 (FIG. 8) during the wiping action.

Thus, a windshield wiper contact according to the invention operates in the following manner.

When the windshield wiper contact is at rest, or in position for wiping a flat surface (FIG. 1), lever 15 rests on the back of wiper blade 5, in 18 via stop 27, and in 17 via the end of part 19.

Under the effect of elastic return mechanisms (not shown) arm 9 exerts force F on shaft 10, tending to apply the wiper blade 5 against the surface to be wiped.

When wiper blade 5 is applied with force F against an area having a convex surface 28 (FIG. 3) of a windshield, distance h2 between armature 2 and wiper blade 5, at right angles with the force F application point, tends to decrease compared to the distance h1 (FIG. 1) that exists in the case of a flat surface (h2 < h1); consequently, lever 15 will swing around shaft 16 in the clockwise direction as shown in FIGS. 1 and 3. The end of lever 15 will press more against the end of wiper blade 5 which is thus forced to conform to convex surface 28 of the windshield.

It is to be noted that the more convex the surface 28 is, the greater the force part 19 of lever 15 in 17 exerts against wiper blade 5, and the curved surfaced is thus followed under proper conditions.

It is clearly understood that the embodiment described above is by no means restrictive and may lend itself to any advantageous modification without departing from the field of the invention; for example, the auxiliary lever can hinge on the other half-armature, or a second auxiliary lever can supplement the first.

What I claim is:

1. A windshield wiper for wiping convex surfaces, said windshield wiper comprising:

an armature member having first and second ends;

a main pivot means located substantially in the middle of said armature member between said first and second ends thereof for pivotably connecting said armature member to a windshield wiper drive arm of a vehicle;

an auxiliary pivot means located between said main pivot means and said second end of said armature member;

at least one compensator pivotably attached to each one of said first and second ends of said armature member;

means attached to each one of said at least one compensators for holding a back edge of an elongated wiper blade having a wiping edge on the front edge thereof for directing a wiping edge outwardly for wiping a convex surface;

an elongated wiper blade having a back edge and a front edge having a wiping edge thereon, and said back edge of said elongated wiper being held by said holding means of said at least one compensators;

an auxiliary lever arm pivotably attached to said auxiliary pivot means of said armature member, said auxiliary lever arm having first and second ends; and means on said first end of said auxiliary lever arm for sliding relative to and for pressing against said back edge of said wiper blade for increasing the force applied thereto by said auxiliary lever arm when said wiping edge is moved by a windsheld wiper drive arm across a convex surface of increasing curvature.

2. A device as in claim 1, wherein said auxiliary pivot means of said armature member is located substantially at the longitudinal midpoint between said main pivot means and said second end of said armature member.

3. A device as in claim 1, wherein said auxiliary lever arm includes first and second parts, said first part extends between said first end of said auxiliary lever arm and said auxiliary pivot means, said second part extends between said second end of said auxiliary lever arm and said auxiliary pivot means, and the length of said first part is different from the length of said second part.

4. A device as in claim 3, wherein each said holding means on said at least one compensators includes at least one secondary compensator pivotably attached to each said at least one compensator, and said second part of said auxiliary lever arm is located substantially above said armature member, above said at least one secondary compensators, and on a side of said armature member opposite to said wiper blade.

5. A device as in claim 4, further comprising a dorsal boss attached to said at least one secondary compensator attached to the said at least one compensator attached to said second end of said armature member, and an opening in said auxiliary lever arm for receiving said dorsal boss therein.

6. A device as in claim 4, wherein said second part of said auxiliary lever arm is substantially U-shaped, said first part of said auxiliary lever arm includes two legs, said means on said first end of said auxiliary lever arm for sliding relative to and pressing against said back edge of said wiper blade is a stop, and said two legs are attached to said stop.

7. A device as in claim 6, wherein said second end of said auxiliary lever arm includes an inwardly curved member having its convex surface facing and contacting said back edge of said wiper blade.

8. A device as in claim 7, wherein said means for holding said back edge of said elongated wiper blade includes at least one holding clip attached to each said at least one secondary compensators for releasably holding said back edge of said wiper blade, a slidable extension having first and second ends is attached at its first end to said inwardly curved member of said second end of said auxiliary lever arm and extends between the said at least one holding clip attached to the said at least one secondary compensator attached to the said at least one compensator attached to said second end of said armature member, and a sliding stop is attached to said second end of said slidable extension.

9. A device as in claim 7, wherein said stop on said first end of said auxiliary lever arm is a shaft, and a slidable flap is attached to said shaft and extends between said back edge of said wiper blade and the said at least one holding clip attached to the said at least one secondary compensator attached to the said at least one compensator attached to said first end of said armature member.

10. A device as in claim 1, further comprising means on said second end of said auxiliary lever arm for sliding relative to and for pressing against said back edge of said wiper blade for increasing the force applied thereto by said auxiliary lever arm when said wiping edge is moved by a windshield wiper drive arm across a convex surface of increasing curvature.

* * * * *